United States Patent [19]

Spurr et al.

[11] 4,310,282
[45] Jan. 12, 1982

[54] DELAY STRETCH AND BLOW MACHINE SYSTEM

[75] Inventors: Robert Spurr, West Hartford; Robert J. Duga, Enfield, both of Conn.

[73] Assignee: Emhart Industries, Inc., Farmington, Conn.

[21] Appl. No.: 13,417

[22] Filed: Feb. 21, 1979

Related U.S. Application Data

[63] Continuation-in-part of Ser. No. 805,918, Jun. 13, 1977, Pat. No. 4,140,464.

[51] Int. Cl.³ .............................................. B29D 23/03
[52] U.S. Cl. .................................... 414/753; 414/226; 294/106; 425/533
[58] Field of Search ............... 414/750, 751, 753, 910, 414/736, 226; 294/87, 96, 106, 115, 116, 118; 425/534

[56] References Cited

U.S. PATENT DOCUMENTS

| | | | |
|---|---|---|---|
| 1,909,813 | 5/1933 | Crosbie | 414/736 |
| 3,075,651 | 1/1963 | Kaden | 414/753 X |
| 3,147,993 | 9/1964 | Broderson | 294/106 X |
| 3,803,993 | 4/1974 | Graham | 414/736 X |
| 3,887,316 | 6/1975 | Hestehave | 425/533 X |

Primary Examiner—Sherman D. Basinger
Assistant Examiner—Terrance L. Siemens
Attorney, Agent, or Firm—A. W. Breiner

[57] ABSTRACT

In a machine system for continuous formation of molecularly oriented plastic bottles by blowing heat-conditioned parisons comprising a plurality of parison-forming stations, i.e., sixteen (16); a plurality of blowing stations, but fewer in number than the number of parison-forming stations, i.e., four (4); and a storage area between the parison-forming and parison-blowing stations, improvements are described primarily in the storage area and in the mechanisms for transferring hot parisons from the parison-forming station to the storage area and from the storage area, sequentially in multiples, to the blowing station.

7 Claims, 27 Drawing Figures

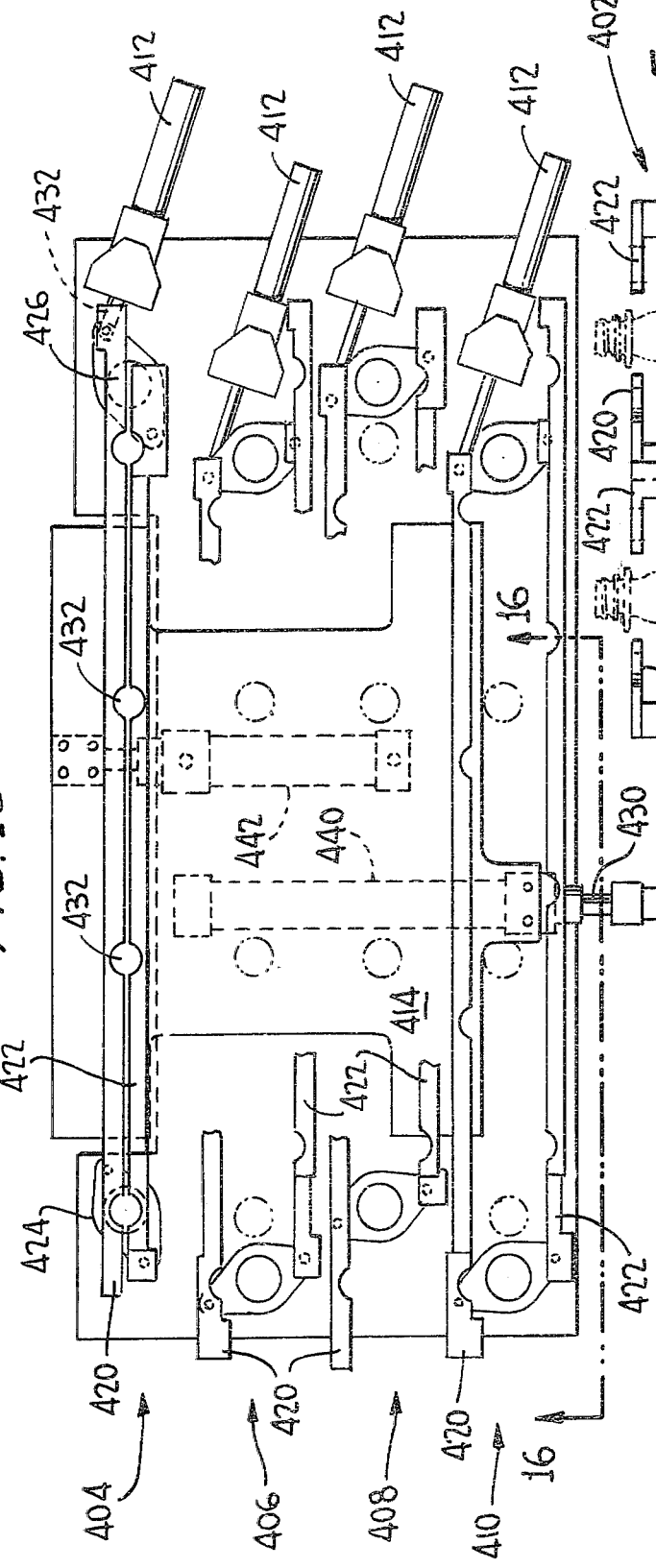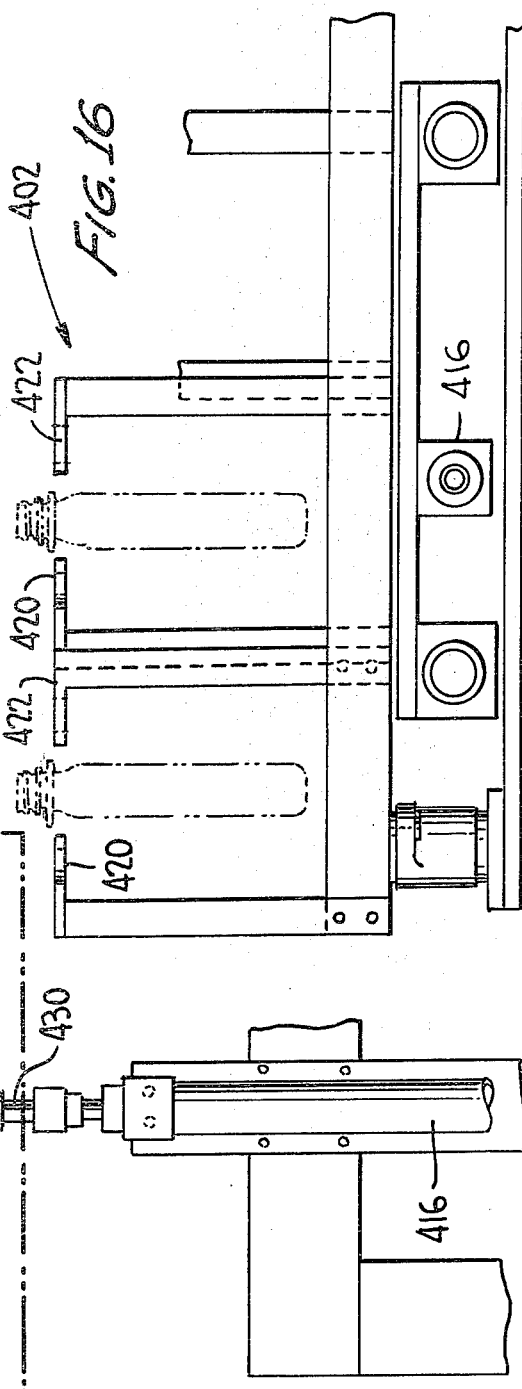

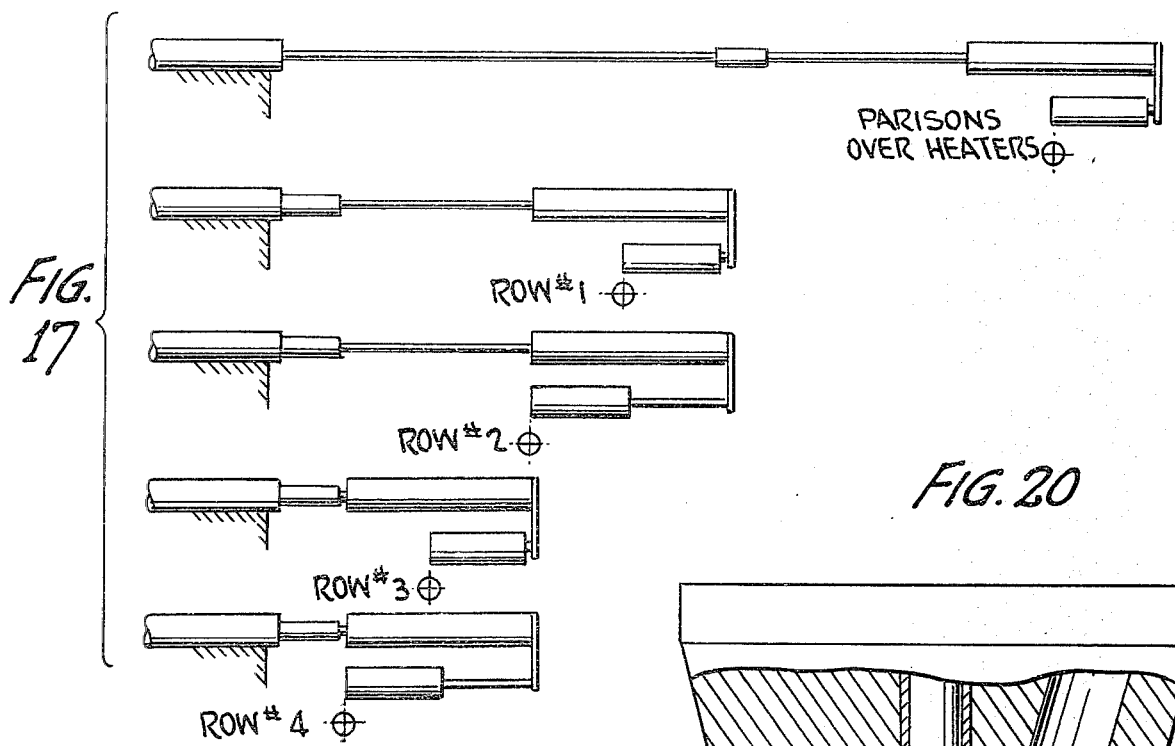
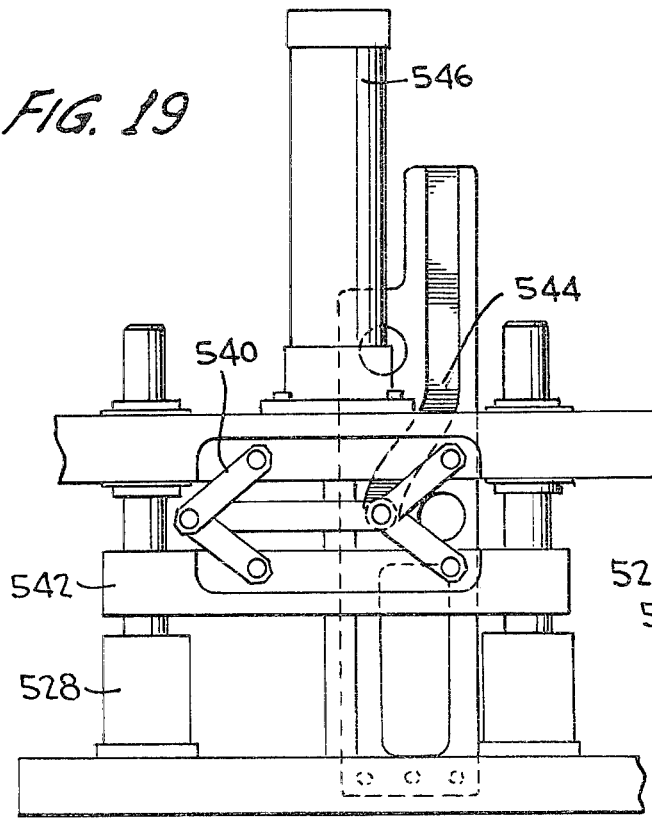
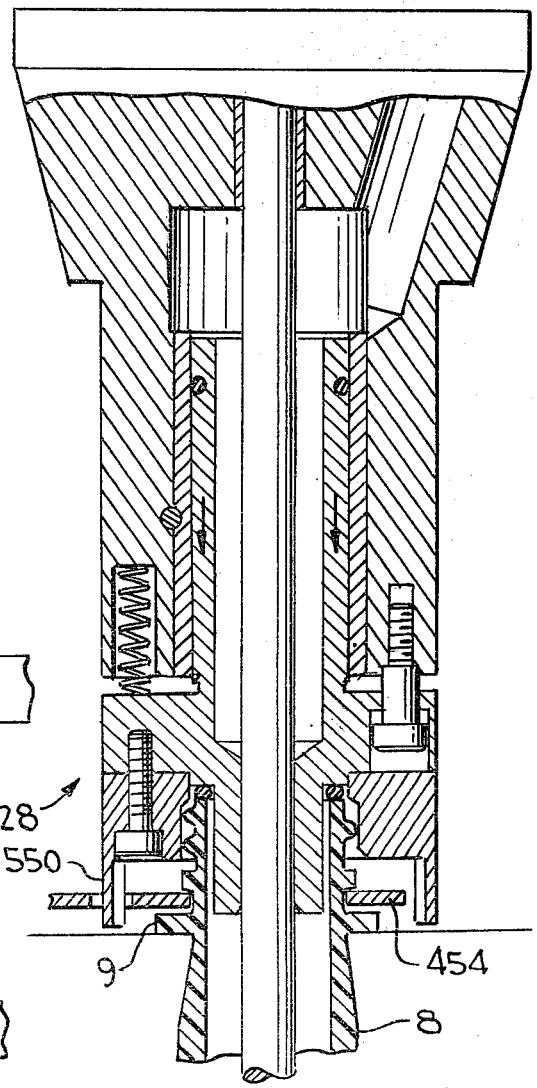

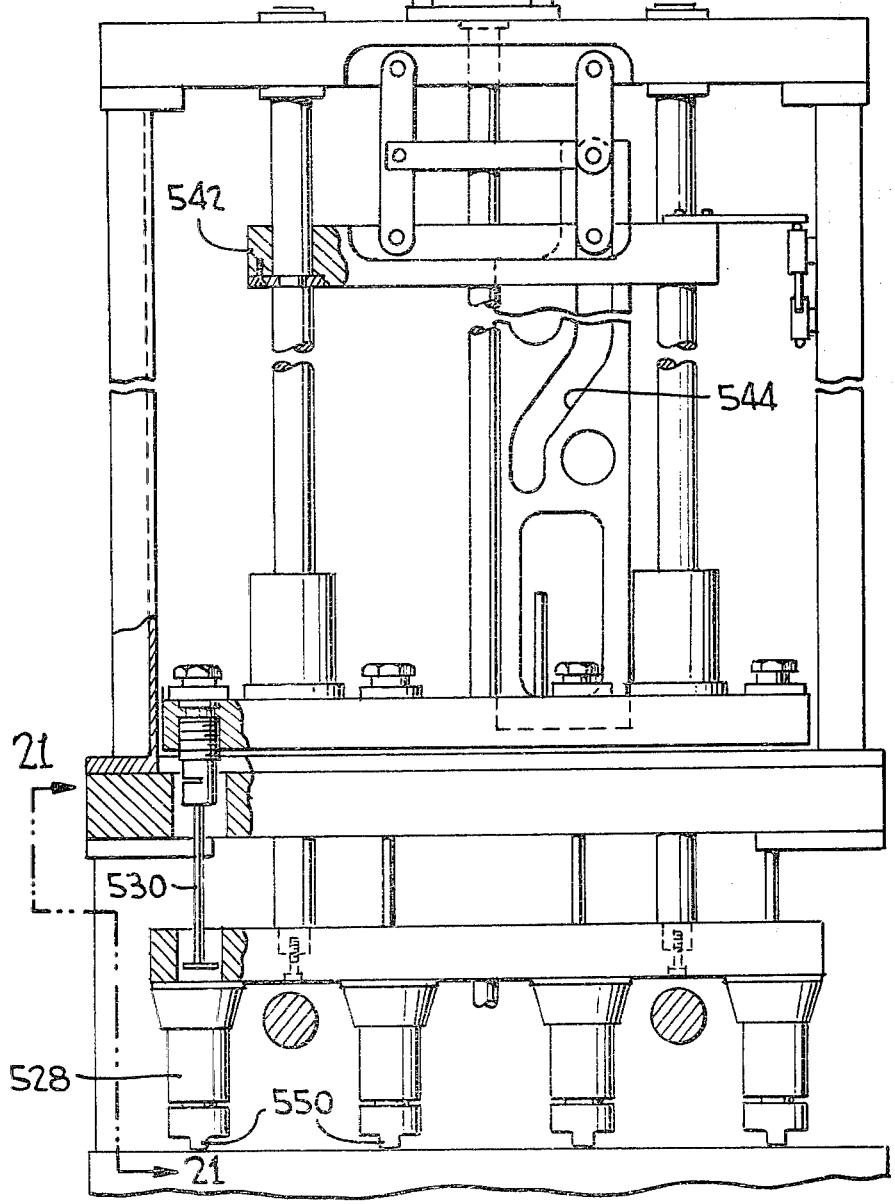
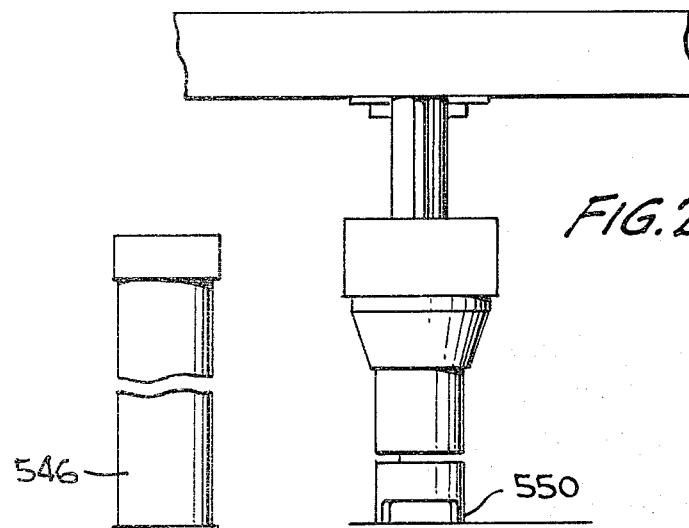

DELAY STRETCH AND BLOW MACHINE SYSTEM

This is a continuation-in-part application of copending application Ser. No. 805,918 filed June 13, 1977, issued Feb. 20, 1979 as U.S. Pat. No. 4,140,464. This application is related to a commonly assigned Duga application filed concurrently herewith entitled "Improved Neck Ring Assembly." The disclosures of both of the aforesaid applications are incorporated into this application by reference.

FIELD OF INVENTION AND BACKGROUND

This invention is directed to a method and apparatus for molding a plastic bottle based on the hot-blow or one-step technique for manufacture of molecularly-oriented plastic bottles. More particularly, it is directed to improvements in a hot-blow or one-step machine system for the manufacture of plastic bottles comprising a given number of parison-forming stations, i.e., sixteen (16); a given but lesser number of blowing stations, i.e., four (4); and a storage area between the parison-forming and parison-blowing stations, permitting a high degree of parison mold and blow mold utilization and overall efficiency; and to the improved method of manufacture.

In recent years substantial effort has been directed to the formation of molecularly-oriented plastic bottles as a replacement, or partial replacement, for glass bottles. According to the prior art, the manufacture of molecularly-oriented bottles have utilized either a reheat, the so-called two-stage, process and system or a hot-blow, the so-called one-stage, process and system. In the reheat or two-stage process, parisons are first injection molded in a parison mold, cooled to room temperature, and stored for subsequent blowing into the finished bottle in a blow-mold. At time of blowing, the parisons are reheated to the blowing temperature of the plastic prior to blowing. In the hot-blow or one-stage process and system, the parison is injection molded in a parison mold and, substantially immediately after formation, is transferred while at the blowing temperature to a blow mold where the parison is blown into the finished bottle.

Each of the above-noted systems and processes have advantages and disadvantages. In the reheat process and system, efficient and effective use can be made of both the parison forming and the blowing stations which need not be integrated. However, substantial thermal energy is lost during the total operation in that the parison, after formation, is cooled down during storage and then reheated at the time of blowing. Moreover, the parisons from storage must be fed to the blow station, duplicating handling. The hot-blow process and system eliminates heat loss and duplicate handling. However, the advantages of the hot-blow process and system are mitigated in that conventionally in order to have proper temperature conditioning of the parison at the blowing station, for each parison station there is a corresponding blowing station. Since the time required for parison formation, including temperature conditioning, is substantially longer than for parison blowing, i.e., approximately twenty seconds for parison formation versus five seconds for parison blowing for a polyethylene terephthalate (PET) bottle, the blowing stations are only inefficiently used.

As described in our aforesaid copending application Ser. No. 805,918, it is now recognized that there can be a substantial delay between parison formation and the blowing of the parison without detriment to the properties of the finished bottle. For example, tests have established that there is no significant change in tensile yield values for delays in blowing of the parison after parison formation of up to ninety seconds and longer; and, furthermore, that temperature distribution in the walls of the parison varies only slightly over substantial periods. Based in part on the aforesaid recognition, a process and machine system is described in our copending application Ser. No. 805,918 whereby the number of blow molds (N/X) is an integral fraction of the larger number (N) of parison or injection molds. A parison storage area is provided between the parison forming and blowing stations. The present invention is directed to improvements in our earlier machine system and in the process of operation to provide a machine system and process which is more compact and trouble-free. The modifications which will be more fully apparent from the following drawing and detailed description of the invention are primarily in the mechanisms employed and the methods used for taking the hot parisons from the parison-forming station; in transferring the hot parisons to the storage unit, and taking and transferring the hot parison from the storage unit to the blow stations.

DETAILED DESCRIPTION AND DRAWING

In the drawing, which illustrates in detail a preferred embodiment and mode of operation, FIG. 1 is a plan view of the overall machine system;

FIG. 15 is a plan view showing primarily the lateral transfer mechanism for positioning the parisons for delivery to the shuttle for final delivery to the blow station;

FIG. 16 is a cross-sectional view taken along lines 16—16 of FIG. 15 showing a section of the lateral transfer mechanism of FIG. 15;

FIG. 17 is a schematic view showing the sequence of operation of the air cylinders of the lateral transfer mechanism;

FIG. 18 is a side view of a blowhead assembly in the down position;

FIG. 19 is a side view of the blowhead assembly in the up position;

FIG. 20 is a sectional view showing detail of the blowhead assembly;

FIG. 21 is a view of one blowhead assembly taken along lines 21—21 of FIG. 18 primarily illustrating the stop mechanism of the assembly when a parison is not present;

Figure 1:
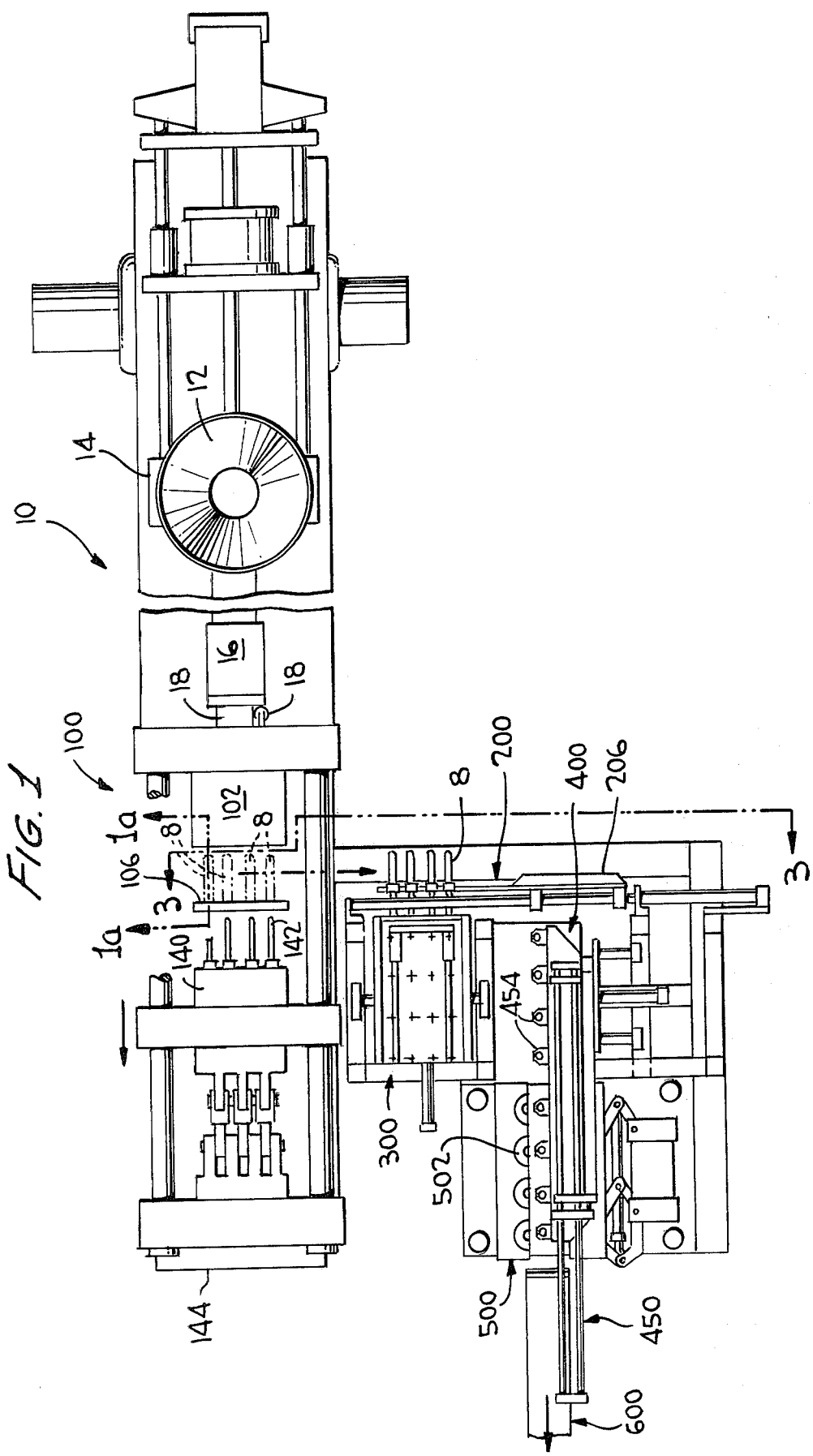
Figure 2:
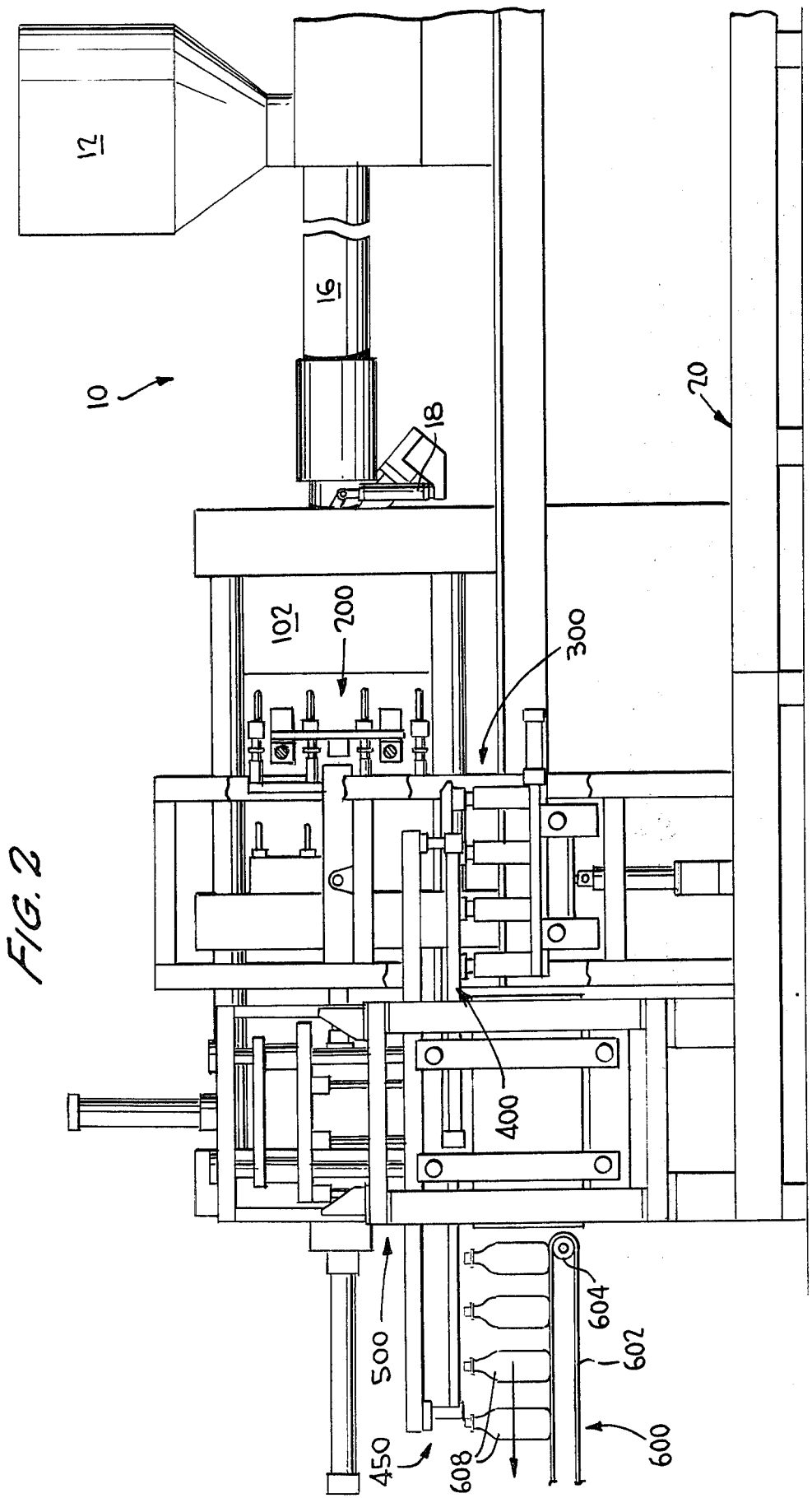
FIG. 2 is a side elevational view of the overall machine system.

Referring now primarily to FIGS. 1 and 2, the machine system of the present application in accordance with application Ser. No. 805,918 comprises an injection assembly 10, a parison-forming section 100, a parison take-out and transfer mechanism 200, a parison storage plate 300, a parison transfer and shuttle mechanism 400, a blow section 500, and a conveyor for taking away finished bottles 600.

Injection Assembly

The injection assembly 10 is of standard or conventional configuration and includes a feed hopper 12 connected to a manifold 14 through barrel and screw 16. The assembly includes a shut-off valve and accumulator piston 18 for maintaining a holding pressure on the preforms compensating for shrinkage as the plastic temperature is rapidly lowered after injection. "Preform" and parison are used herein interchangeably. The entire assembly is mounted on a square weldment frame 20. Details of the injection assembly are shown in greater detail in application Ser. No. 805,918.

Parison-Forming Section

Figure 3:
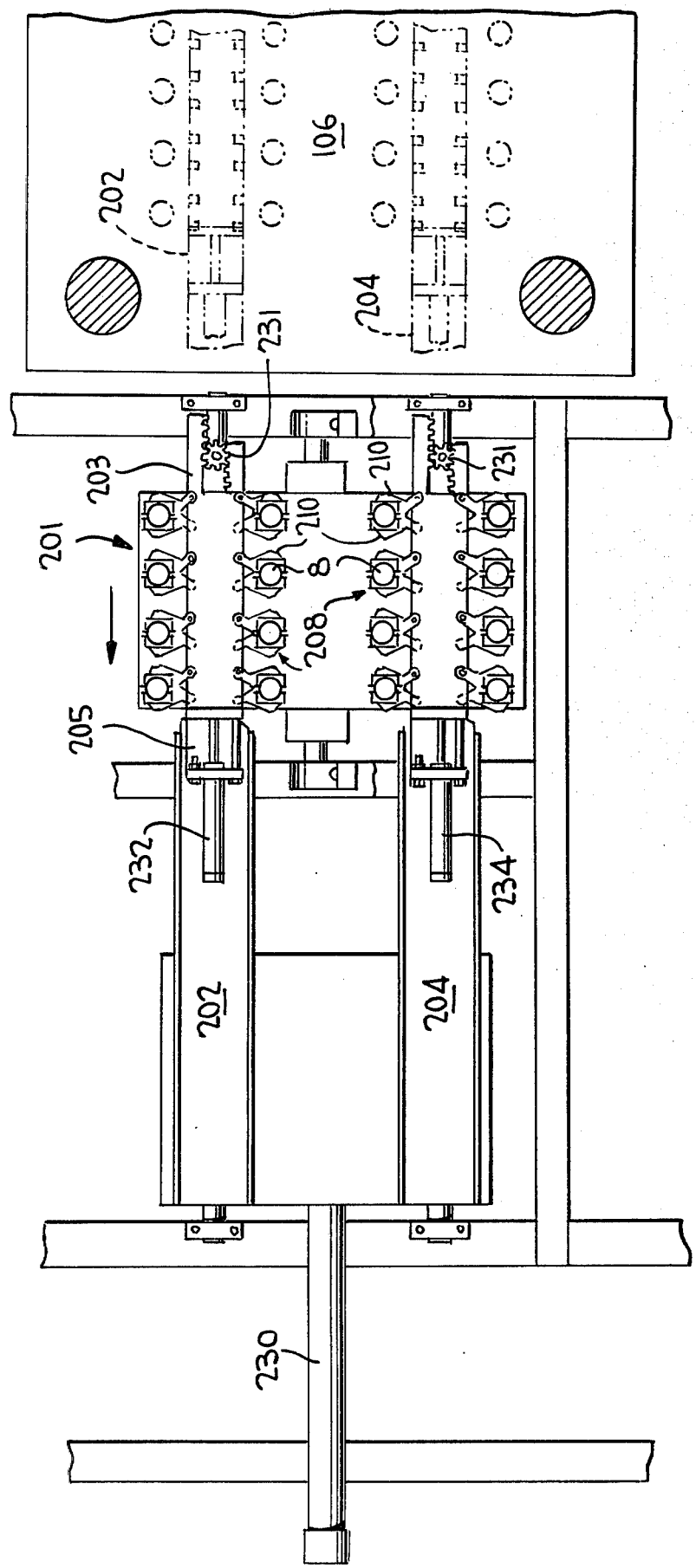
FIG. 3 is a cross-sectional view taken along lines 3—3 of FIG. 1 showing primarily the parison take-out mechanism.
Figure 4:
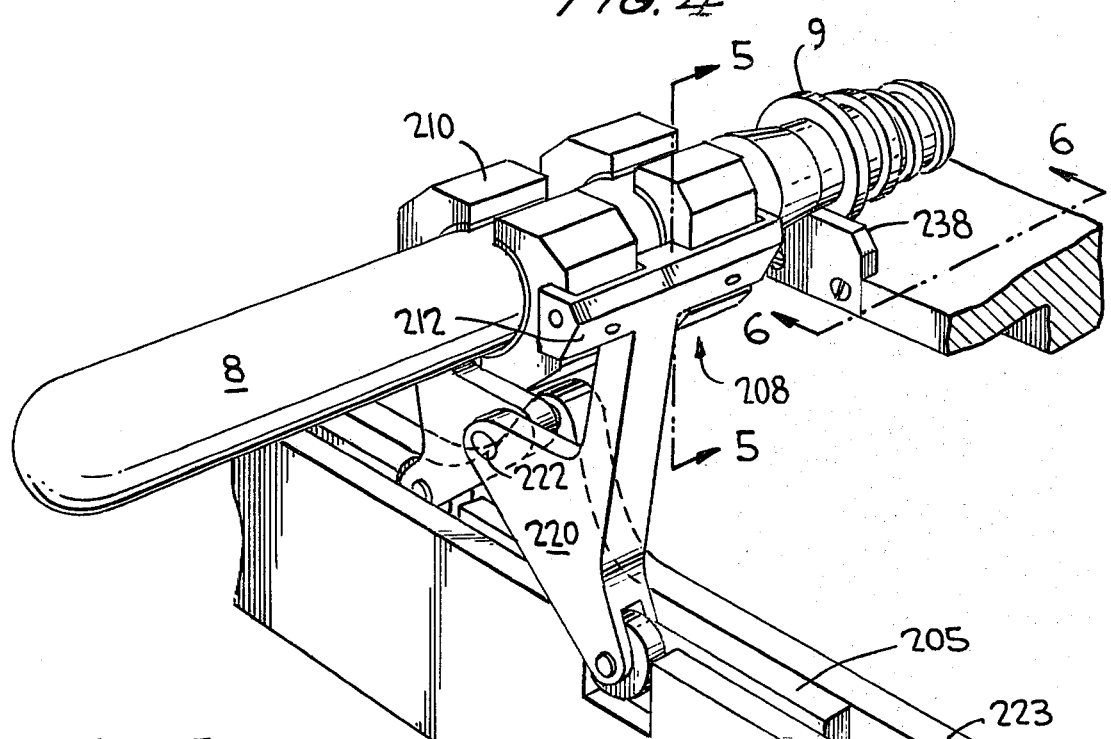
FIG. 4 is a perspective view of one parison take-out gripper and related mechanism.
Figure 5:
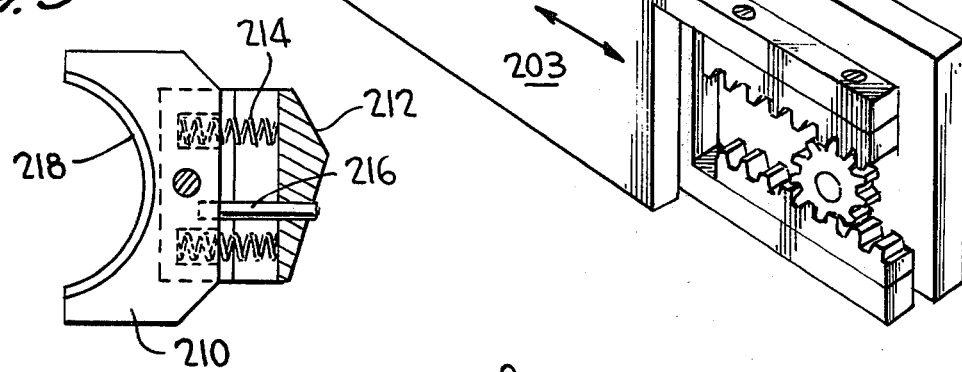
FIG. 5 is a cross-sectional view taken along lines 5—5 of FIG. 4.
Figure 6:
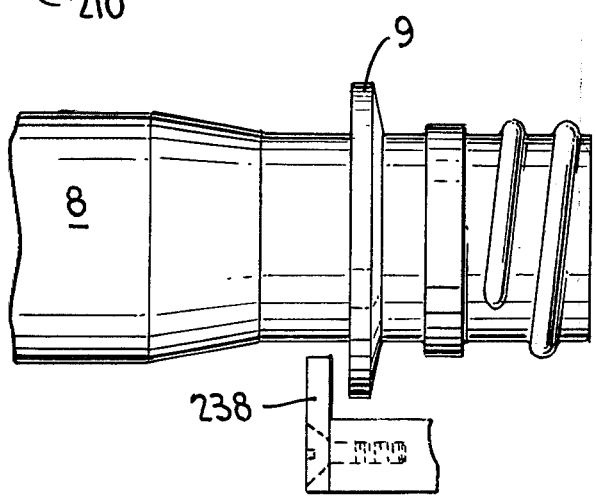
FIG. 6 is a broken-away view looking in along lines 6—6 of FIG. 4.

Referring now primarily to FIGS. 1, 2 and 3, the parison-forming section 100 includes a stationary mold section 102 containing sixteen mold cavities, each mold preferably having a circumferential cooling passage, all being of conventional design and, accordingly, not shown in detail. The neck ring assemblies 104 are fixed to plate 106 and support the parison 8 when withdrawn from the mold. The neck ring assembly and its operation are more fully described in the concurrently filed Duga application entitled "Improved Neck Ring Assembly" hereinbefore noted. Sixteen neck rings, preferably liquid cooled, are attached to plate 106. The parison-forming mold also includes a core rod mold plate 140 which is on the main movable platen of the parison-forming press and applies the force to the mold components. The core rod mold plate contains sixteen core rods 142 which are preferably individually liquid cooled. The press is actuated by toggle means, or other suitable means including hydraulic means, carried on base 144. The parison-forming press is shown in greater detail in Ser. No. 805,918.

Parison Storage Section

Figure 12:
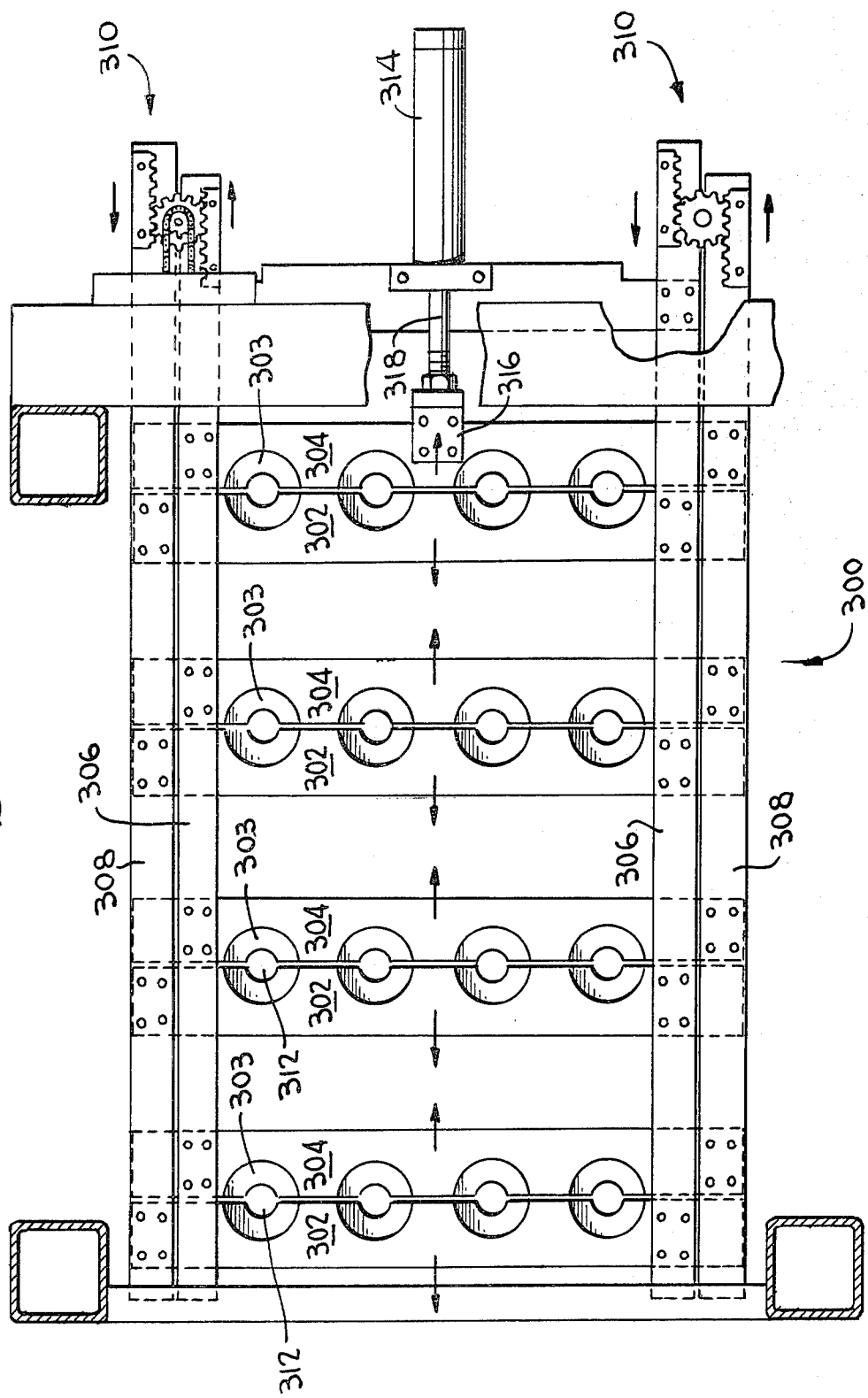
FIG. 12 is a plan view of the storage plate for retaining parisons, not shown.

The storage section 300 serves two purposes. One is to provide a holding position for the parisons prior to transferring to the blow stations; and the other is to hold the group of preformed parisons during a conditioning heat period. The storage section 300 as best shown in FIG. 12 comprises a storage plate made up of four coupled jaw sets formed by bars 302 and 304, each forming four holding jaws 303. In addition to the four coupled jaw sets, the storage plate includes two pair of longitudinally extending bars 306 and 308. Each pair of bars 306 and 308 is driven by a rack and pinion 310. All of the moving components of the storage plate are moved simultaneously by a single air cylinder 314 attached to one of bars 302 at 316. Upon actuation of air cylinders 314, piston rod 318 retracts causing bars 304 to move toward the cylinder and at the same time rack and pinion 310 causes the second pair of bars 302 to move in the opposite direction. This movement opens and closes the jaw sets and forms openings 312 when closed for holding the parisons.

Take-Out And Transfer Section

Referring primarily to FIGS. 1-11, it will be seen that the transfer mechanism includes a take-out mechanism 201 which picks the hot parisons 8 from the parison-forming section 100 with gripper jaw sets 208 while the parisons are extending longitudinally on neck ring plate 106 held by neck ring assembly 104. After the parisons have cleared the parison-forming station, the control of the gripper jaws is relinquished to collets 249 which carry the parisons through a ninety degree angle and positions them for acceptance by the storage plate, previously described.

Thus, referring primarily to FIGS. 3-6, the take-out mechanism comprises two sets of arms 202 and 204, each set mounted on a carriage 206. Each arm in turn carries eight gripper jaws 208. Each gripper jaw comprises four separate gripping fingers 210. The gripping fingers, attached to U-shaped member 212 through spring 214 and guide pin 216, are padded with an insulating material 218 to minimize heat-transfer on the body surface of the parison. The U-shaped member is integral with a scissor arm 220 pivotable on pivot member 222. Each of the scissor arms 220 is attached to a support member 223. Carriage 206 is moved transversely into and out of the parison-forming section by a single air cylinder 230. Each set of eight gripper jaws is operated individually by air cylinders 232 and 234 moving actuator members 203 and 205 in conjunction with rack and pinion 231. The take-out mechanism extends into the parison section, picks the hot parisons from the parison-forming station with gripper jaws 208 working in conjunction with the neck ring assembly, as previously defined, and carries the preforms into the position shown in FIG. 3.

Figure 7:
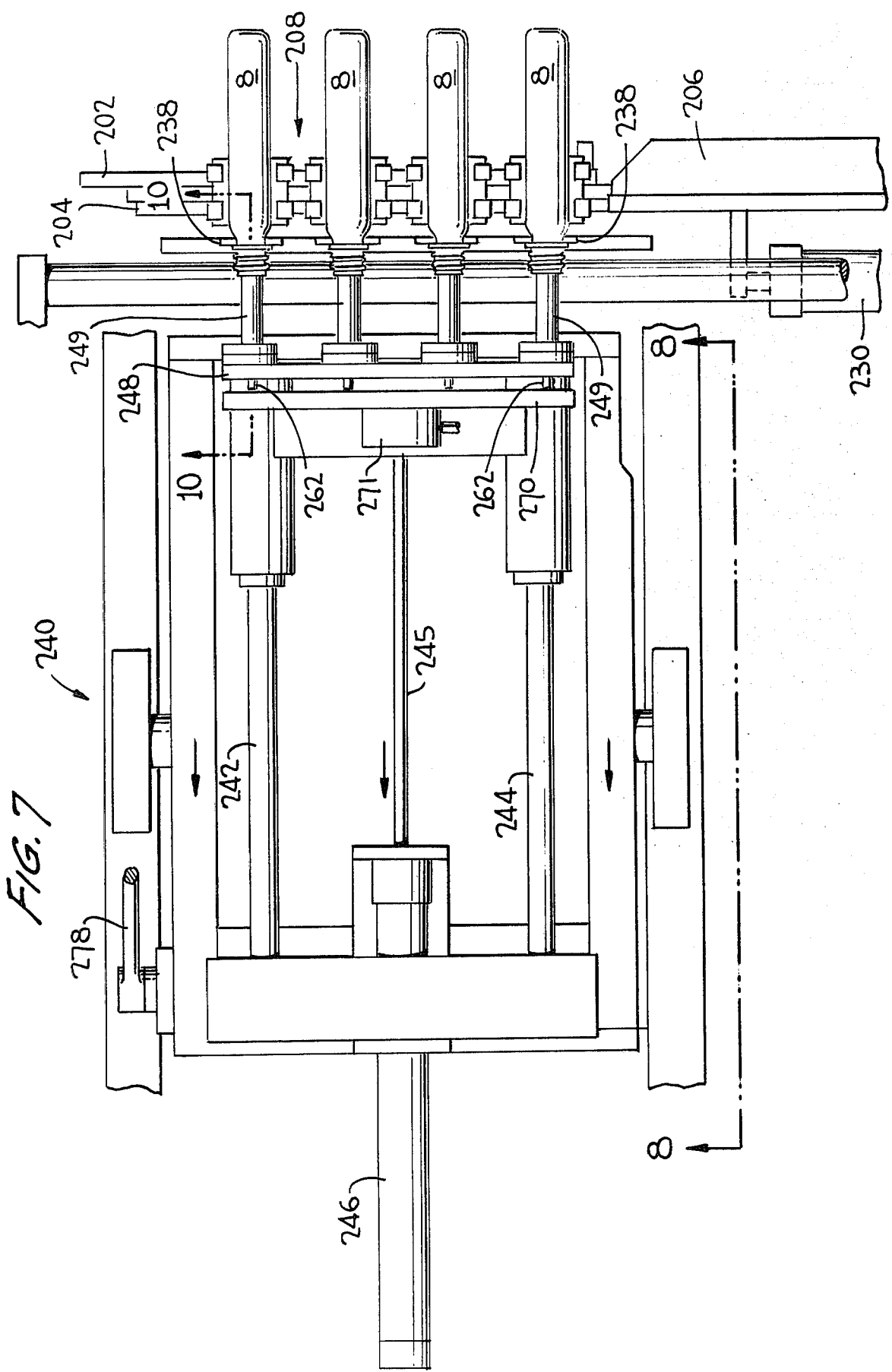
FIG. 7 is a plan view showing primarily the horizontal movement of the transfer mechanism for transferring parisons from the parison-forming station to the parison storage area.
Figure 8:
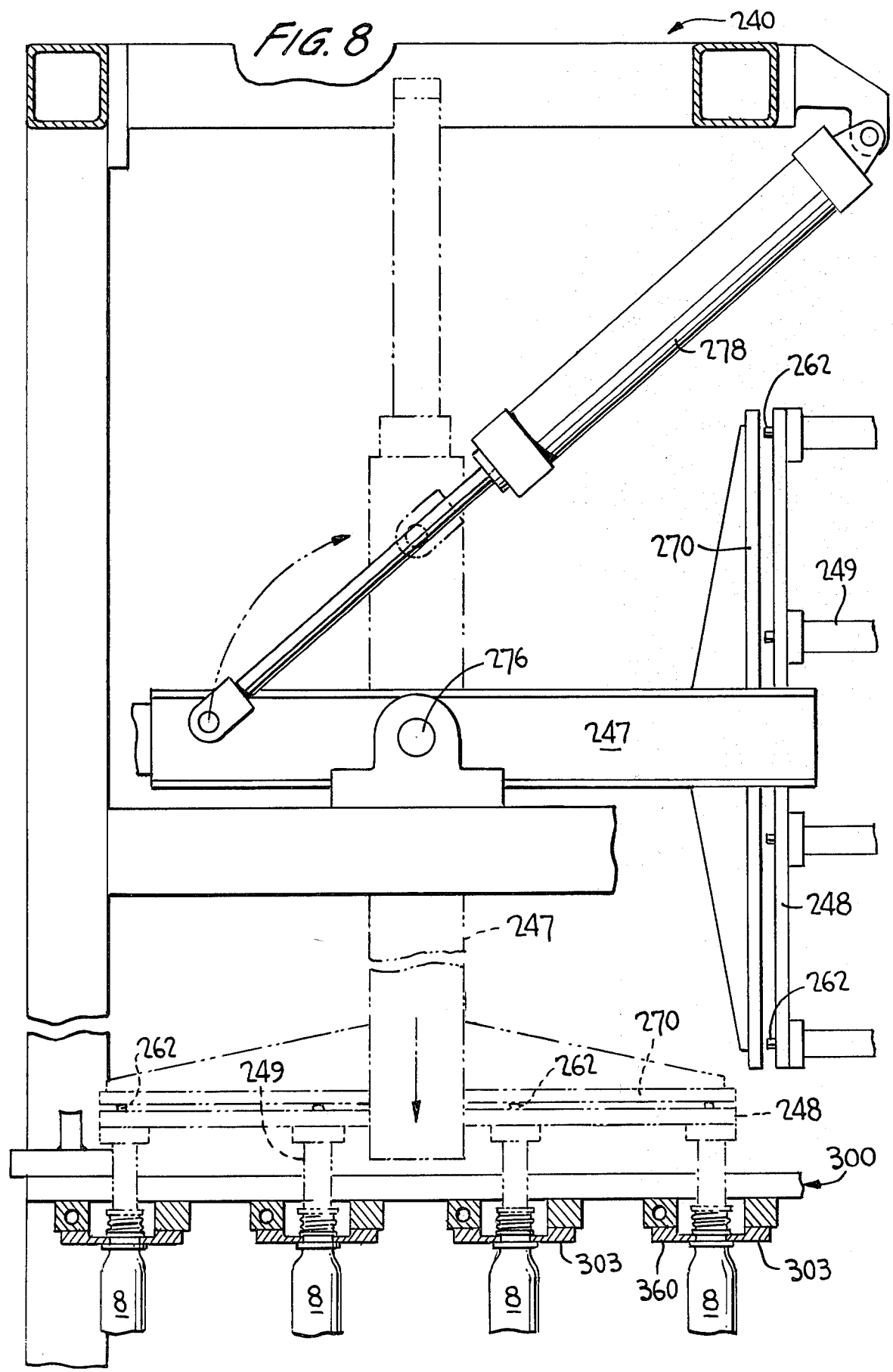
FIG. 8 is a side view partly in phantom lines showing primarily the rotary movement of the transfer mechanism for transferring parisons from the parison-forming station to the parison storage area.

When the preforms are positioned as shown in FIG. 3, a rotary transfer mechanism 240, referring primarily to FIGS. 7 and 8, laterally movable on support rods 242 and 244 by air cylinder 246, transports the preforms from the take-out gripping fingers 210 to the storage plate 300, positioning the preform in a vertical base down position. The rotary transfer mechanism or unit includes a pivotally mounted frame 247 to rotate transverse plate 248 through a ninety degree arc. The transverse plate contains sixteen air-operated collets 249 which are inserted into the open ends of the preforms, then expanded to hold each preform securely.

Figure 9:
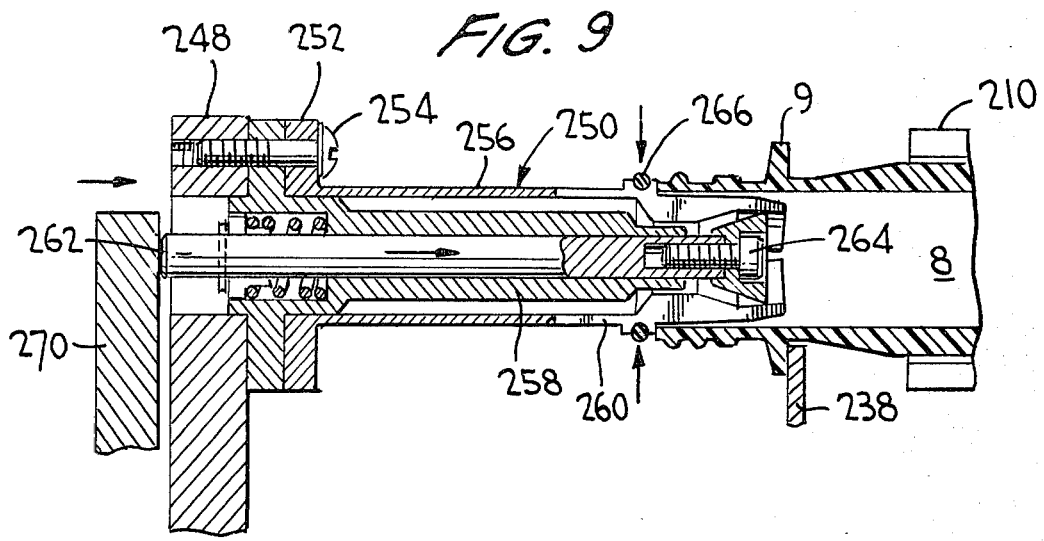
FIG. 9 is a cross-sectional view of a single collet in the non-gripping mode which forms a part of the parison transfer mechanism.
Figure 10:
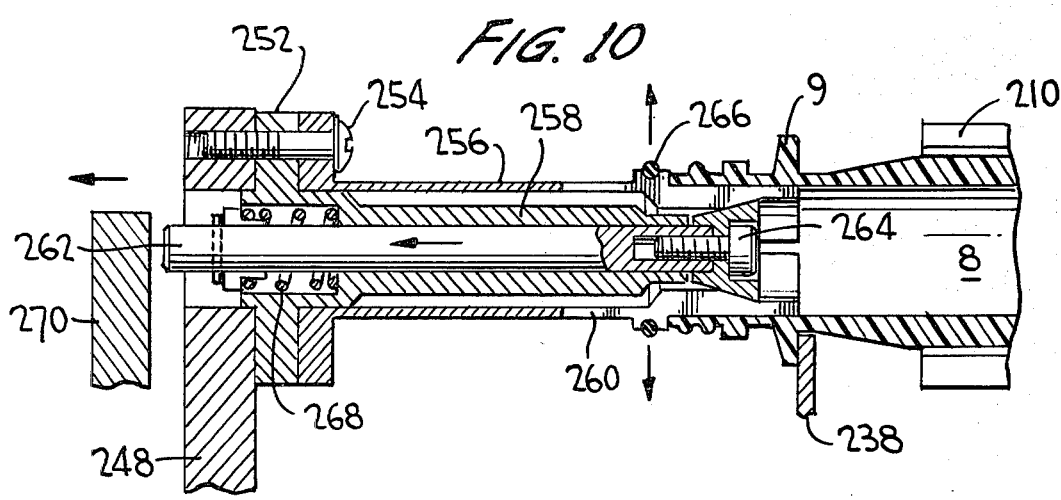
FIG. 10 is a cross-sectional view of a single collet taken along lines 10—10 of FIG. 7 in the gripping mode.
Figure 11:
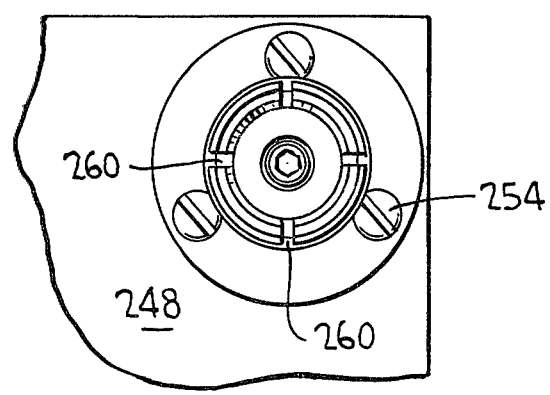
FIG. 11 is an end view of a single collet.

Each collet 249 comprises, as seen most clearly from FIGS. 9–11, a probe member 250 securely anchored at base members 252 by screws 254 to transverse plate 248. The probe member includes an outer sleeve 256 and an inner sleeve 258 spaced therefrom. The outer sleeve contains slits 260 at its end, as seen most clearly in FIG. 11; whereas the inner sleeve fits snugly onto a collet actuating member 262 which ends in a camming surface 264 which coacts with the outer sleeve. Additionally, there is an O-ring member 266 which circumscribes the outer sleeve 256. Actuating member 262 is acted upon by spring 268 when plate 270, actuated by air cylinder 271, simultaneously contacts each actuating member and presses inward against spring 268. As best shown in FIG. 9, camming surface 264 is pushed inward and sleeve member 256 is contracted by O-ring 266 so that the collet will enter a parison 8. Upon release of pressure on actuator 262 by plate 270, the end of the collets are expanded by surface 264 to grip the parison 8.

The transfer mechanism as shown most clearly in FIGS. 7 and 8 is pivotally mounted at 276 to allow transverse plate 248 when retracted fully in the direction of the arrows in FIG. 7 to rotate ninety degrees carrying the collets and parisons into the vertical position through actuation of air cylinder 278. When plate 248 is in the vertical position as shown in FIG. 8, the parisons controlled by collets 249 are lowered vertically to be received by storage plate 300 with closing of jaws 303. Plate 270 actuates members 262 to release the parisons from the collets as plate 248 is retracted vertically by air cylinder 246.

Temperature-Conditioning Element

Figure 13:
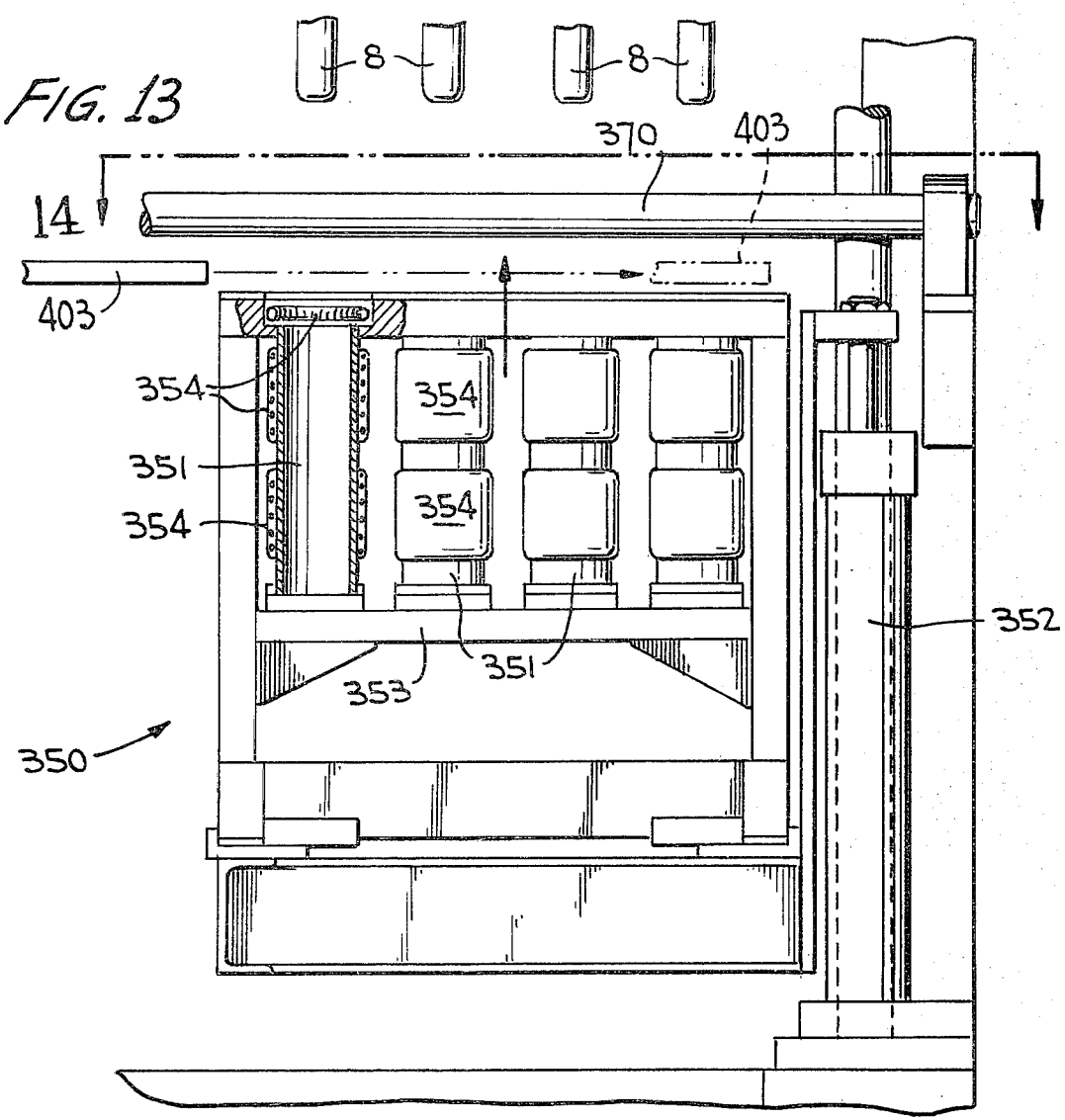
FIG. 13 is a side view of the heating element which may be employed to heat-condition stored parisons.
Figure 14:
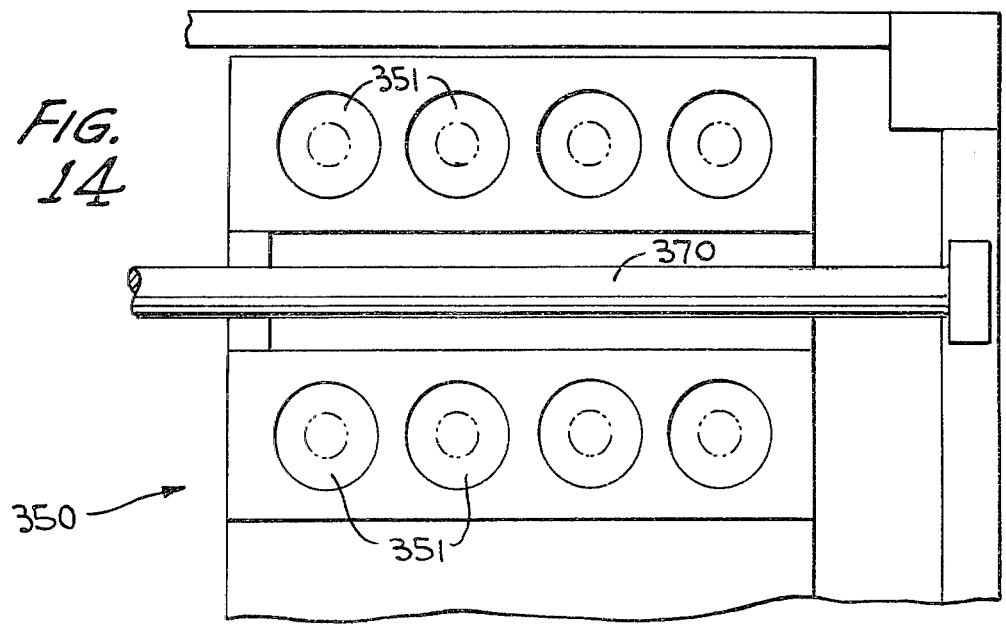
FIG. 14 is a broken-away plan view of the heating element shown in FIG. 13.

The storage section includes, in addition to storage plate 300, a heat-conditioning element 350 which, as best seen in FIGS. 13 and 14, is vertically movable on guide rods 352. The heating element comprises sixteen individual pockets 351 for receiving parisons 8 while retained in storage plate 300. Each pocket contains heating elements 354 which will circumscribe the parison 8. As will be more fully apparent hereinafter, the heating element 350 must travel vertically a sufficient distance to free the path for the transverse movement of the lateral transfer device into position for the shuttle mechanism. FIG. 13 shows the movement of the bottom 403 of the lateral transfer plate 402 and the bottoms of preforms 8. Additionally, the temperature-conditioning element is constructed so that its vertical movement is uninhibited by stationary rods 370 which carry the lateral transfer unit. This is accomplished by having the individual pocket units integral with a common floor 353.

Lateral Transfer And Shuttle Mechanism

The preformed parisons, after temperature-conditioning and the lowering of the heat-conditioning element 350, are received from the storage plate 300 by a lateral transfer unit 402, which moves in transversely between the rows of preforms in the storage plate 300. The lateral transfer unit as best shown in FIGS. 15 and 16 comprises four carrier bar sets 404, 406, 408 and 410, each with independently actuating air cylinders 412 and mounted on a slidable lateral transfer carriage 414. Each of the four carrier bar sets include encompassing gripper bars 420 and 422 which are moved about centers 424 and 426 by air cylinder 412 to form four sets of jaws 413. When the piston rods 430 of the air cylinder 412 are retracted, the jaws 413 are closed forming openings 432, see set 404, which hold the preform. When the piston is extended as in 406, 408 and 410, the jaws 413 are open. This permits, as will be more fully developed hereinafter, the parisons of the respective rows to be individually and sequentially received by the shuttle mechanism. The transfer carriage is moved transversely into and out from under the storage plate by a single air cylinder 416.

After the transfer unit has been moved in, and transversely out from under the storage plate after collecting the preforms, individual actuating cylinders then advance or index the carriage so that each carriage bar set is positioned with respect to the shuttle to transfer a row of four preforms to the blow mold as schematically shown in FIG. 17. The indexing carriage dispenses all four rows and then returns to the storage plate for a new set of preforms.

The individual rows of preforms in the lateral transfer unit are positioned for receipt by the shuttle mechanism by three individual actuating cylinders, i.e., cylinder 416 and cylinders 440 and 442 shown in phantom lines in FIG. 15. As shown schematically in FIG. 17, the first cylinder, 416, and the second cylinder are fully extended and the third cylinder is retracted when under the storage plate. When the first cylinder is retracted, the second cylinder is extended and the third cylinder is retracted, the first row of parisons is positioned for receipt by the shuttle. Once the first row of parisons is received, the lateral transfer mechanism is indexed by the second cylinder remaining extended, with the third cylinder being extended, to position the second row of parisons for receipt by the shuttle mechanism. The third row of parisons or preforms is positioned by the second cylinder being retracted and the third cylinder retracted. The fourth and last row is positioned again by the third cylinder being extended. As will be apparent, the lateral transfer jaws must provide a free path for the preforms in two directions to permit the shuttle mechanism to come in and select and remove the preforms and to permit the lateral transfer jaws to pass between the downward extended preforms in the storage plate.

Figure 23:
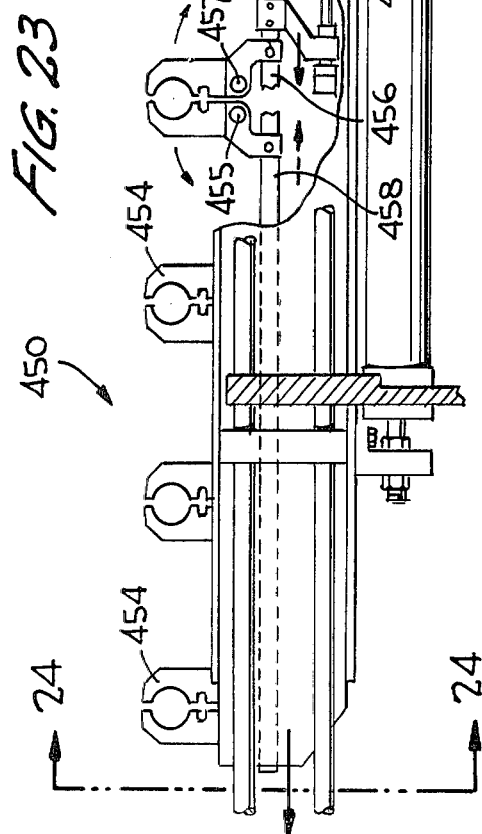
FIG. 23 is a plan view of the shuttle mechanism for transferring the parisons from the storage area into the blow molds.
Figure 24:
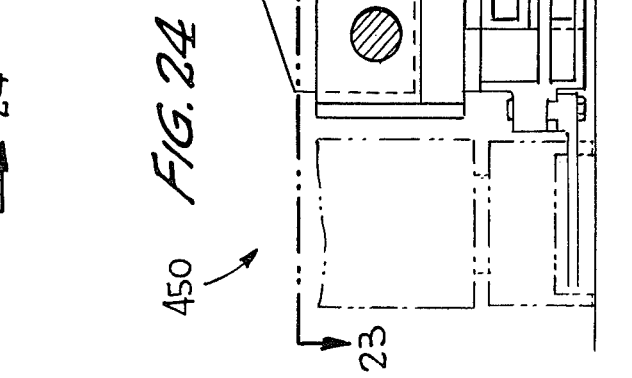
FIG. 24 is a cross-sectional view of the shuttle mechanism taken along lines 24—24 of FIG. 23.

The preforms are received from the lateral transfer jaws by shuttle mechanism 450. The shuttle mechanism as best shown in FIGS. 23 and 24 includes eight spaced apart jaw sets 454 arranged side by side on shuttle frame 451 at fixed pivots 455 and 457. The jaws of the shuttle are opened and closed by the co-action of air cylinders 462 and 464. The shuttle mechanism is traversed between two positions as shown diagrammatically in FIG. 25 by a single air cylinder 460.

Figure 25:
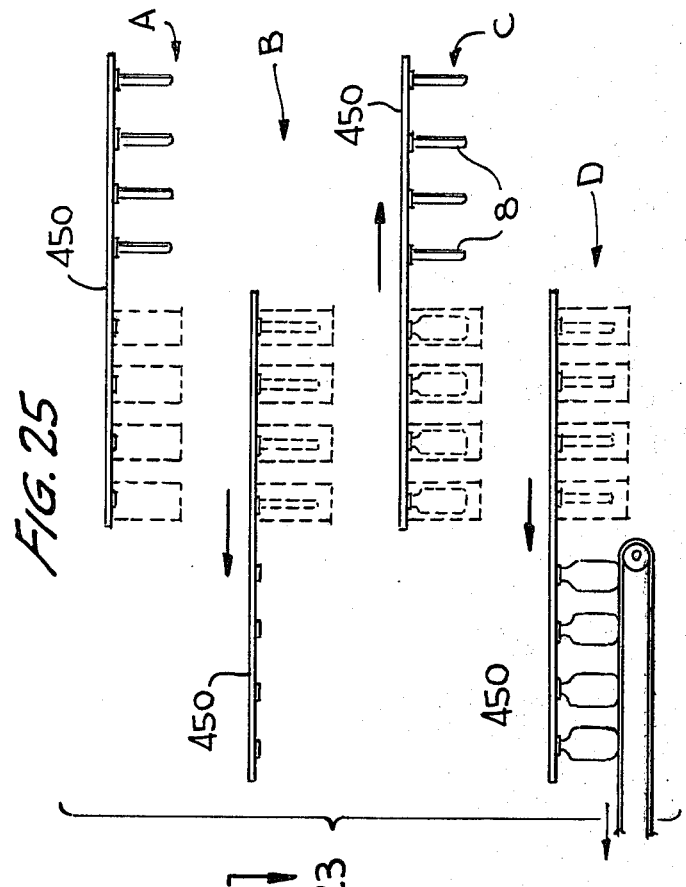
FIG. 25 is a schematic view of the operation of the shuttle mechanism.

Referring to FIG. 25, in a first and start-up position A, the shuttle mechanism receives a first set of four preforms from the first row of the lateral transfer unit and in a second position B deposits the preforms in the blow mold 502 of the blow mold section. Thereafter, the shuttle mechanism moves forward during the blowing of the first set of parisons to a third position C to receive a second set of four preforms from row two of the lateral transfer unit. Thereafter, the shuttle mechanism in a fourth position D deposits four blown bottles 608 taken from the blow molds, i.e., the bottles formed from the preforms of row one; onto a conveyor assembly 600 and deposits four fresh parisons into the blow mold. The cycle is continuously repeated.

Blow Mold Section

Figure 22:
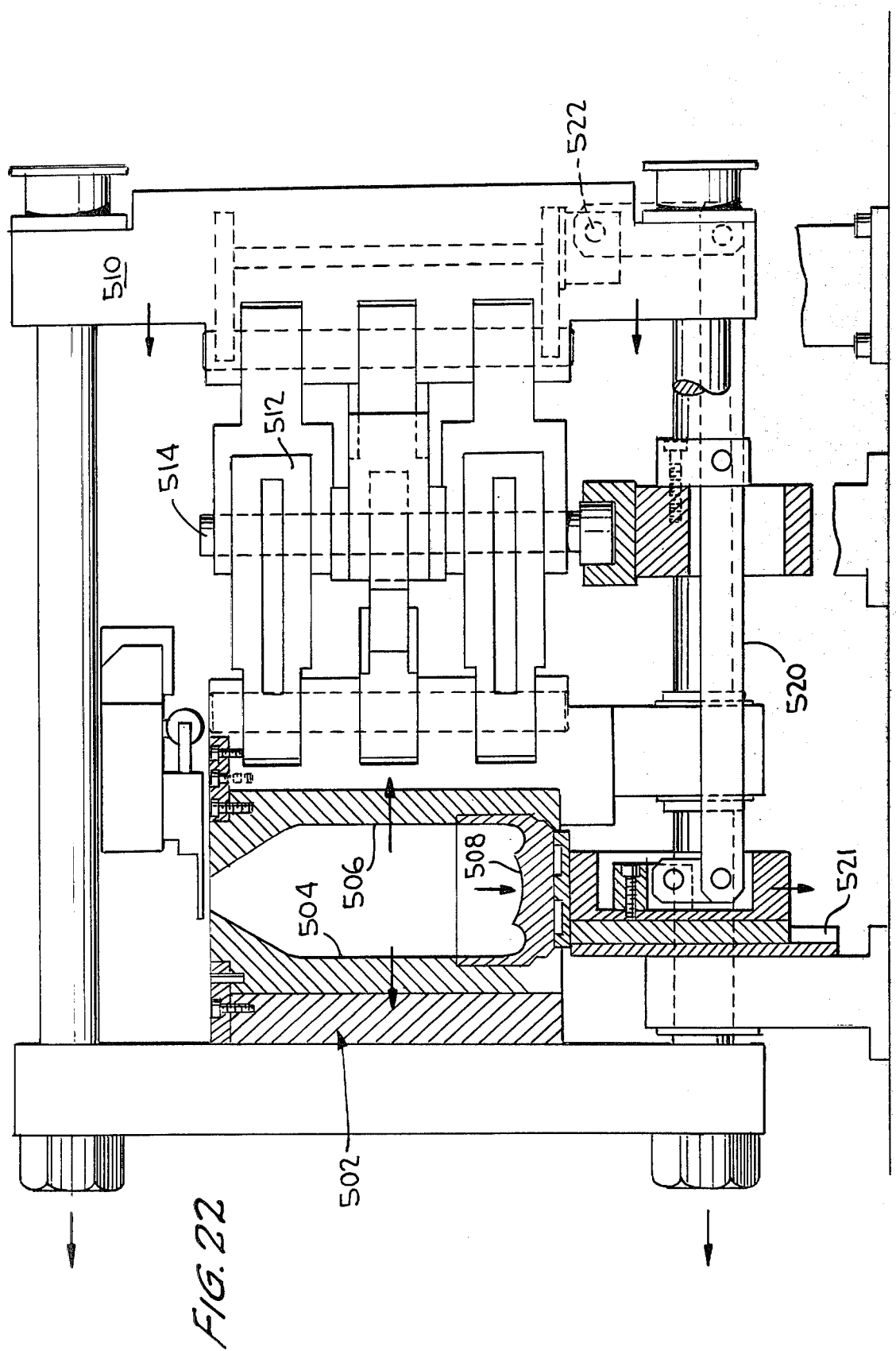
FIG. 22 is a view of the blow mold assembly partially in section.

The blow mold section 500 comprises four liquid-cooled molds 502 which split simultaneously for opening and closing of the molds to allow for insertion of the parisons and for finished bottle removal. As best shown in FIG. 22, the blow mold comprises side sections 504 and 506, and bottom section 508. The side sections 504 and 506 move away from each other simultaneously as frame member 510 moves inward through actuation of toggle linkage 512 about fixed center 514. As mold halves 504 and 506 commence opening, the bottom section of the mold 508 moves downward in slideway 521 as frame member 510 moves inward and linkage 520 is actuated pivoting about points 519, 522, 523 and 524.

Once the molds are closed, the blowheads 528, as best shown in FIGS. 18-21, are brought into the down position actuating stretch rod 530. The positioning and actuation of the blowheads is controlled by toggle arrangement 540 moving carriage 542 through camming groove 544 with air cylinder 546. The toggle and cam arrangement lock the blowhead into the down position.

As seen in FIG. 20, when the blowhead is in the down position, the flange 9 on the neck ring of the parison rests on top part 548 of the blow mold. In this position the jaws 454 of the shuttle mechanism because of their construction are free to move in under the blowhead and around legs 550 and engage the parison above the top of the parison flange. The shuttle jaw construction, permitting the jaws to come into position and to be removed while the blow mold is in the operating or down position, permits greater speed in the operation of the unit.

As is also apparent from FIG. 20, the blowhead is actuated by deliverying air under high pressure through passage 525 to the top of the blowhead 528 positioned in sleeve 529 by spring 526. The air pressure on the top of the blowhead causes the blowhead to slide in sleeve 529, and effectively functions as a piston forcing the blowhead into sealing engagement with elastomeric seal 527. The downward thrust of the blowhead is opposed by the toggle and cam lock arrangement. As is apparent, legs 550 do not contact the mold if a preform is present; but in the event a preform is not present, the legs will rest on the top of the blow mold. This prevents downward movement of the blowhead in the event a parison is inadvertently not present.

Conveyor Section

The conveyor section 600 comprises a suitable endless belt 602 on rollers 604 constructed and arranged in relation to the blow mold section to receive and convey away finished bottles 608 dropped thereon by shuttle 450.

Mode Of Operation Of Machine System

The machine system is designed to operate on a 20-second cycle, suitable for PET. However, the cycle can be varied to suit processing requirements for any particular plastic material.

As described in Ser. No. 805,918, at the parison-forming station the parison or preform press, at the commencement of the operation, is closed with the neck ring carrier plate 106 and core rod plate 140 in the mold position and with the injection nozzles forward for injection. Granular plastic from feed hopper 12 which has been properly plasticized in the reciprocating screw 16 is injected under high ram pressure through the manifold into the preform mold cavities, not shown. The nozzle valve closes permitting the injector screw to plasticize the next charge for the next set of parisons. The accumulator piston 18 maintains the holding pressure on the preforms, compensating for shrinkage as the plastic temperature is rapidly lowered. After the injection of the parison is complete and the parison temperature-conditioned, the core rod platten 140 is retracted as neck ring carrier plate 106 is also being retracted carrying the finished parisons 8 from within the parison mold plate 102 as best shown in FIG. 1. The preforms are then ready to be transferred to the storage area.

As best shown in FIGS. 1 and 2, the take-out mechanism 201 thrusts into the opened parison mold and the gripper jaws 208 grasp each preform at which time the neck ring assemblies 104 open as previously described. The take-out mechanism riding on carriage 206 withdraws the parisons allowing the injection mold to close to begin the cycle for forming the next group of preforms.

Figure 26:
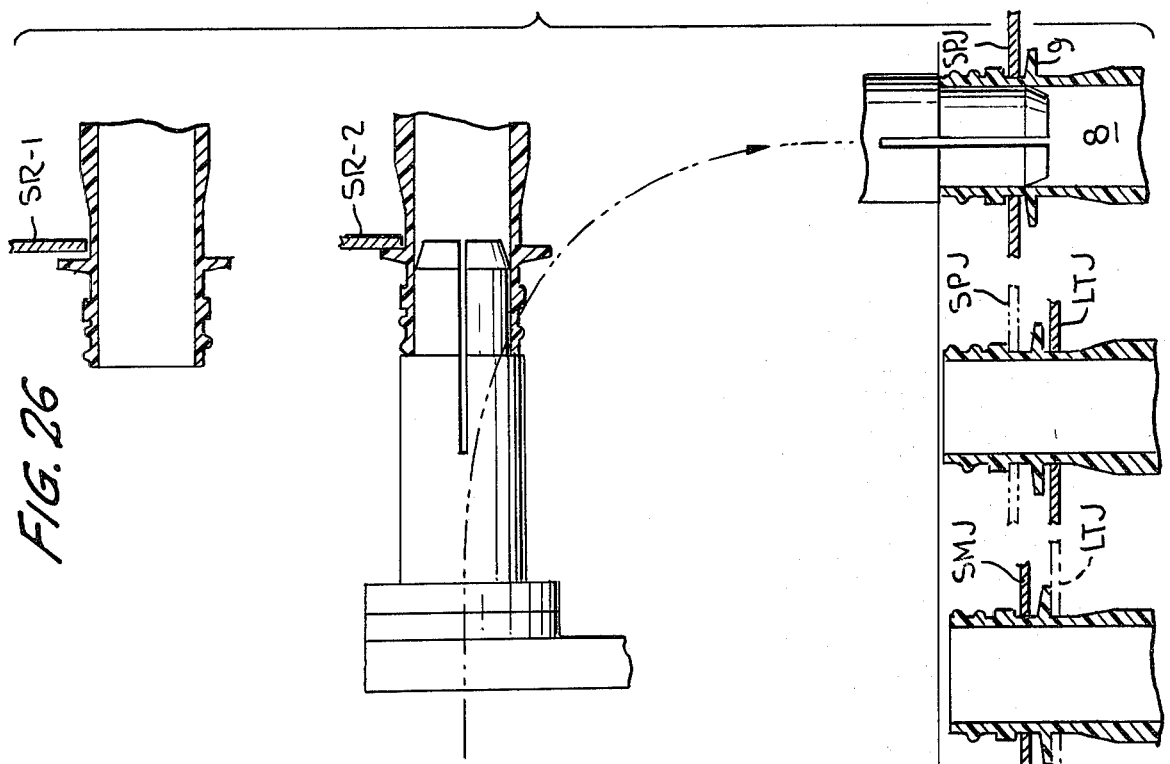
FIG. 26 is a schematic view showing the parison and bottle movement through the machine system.
Figure 22A:
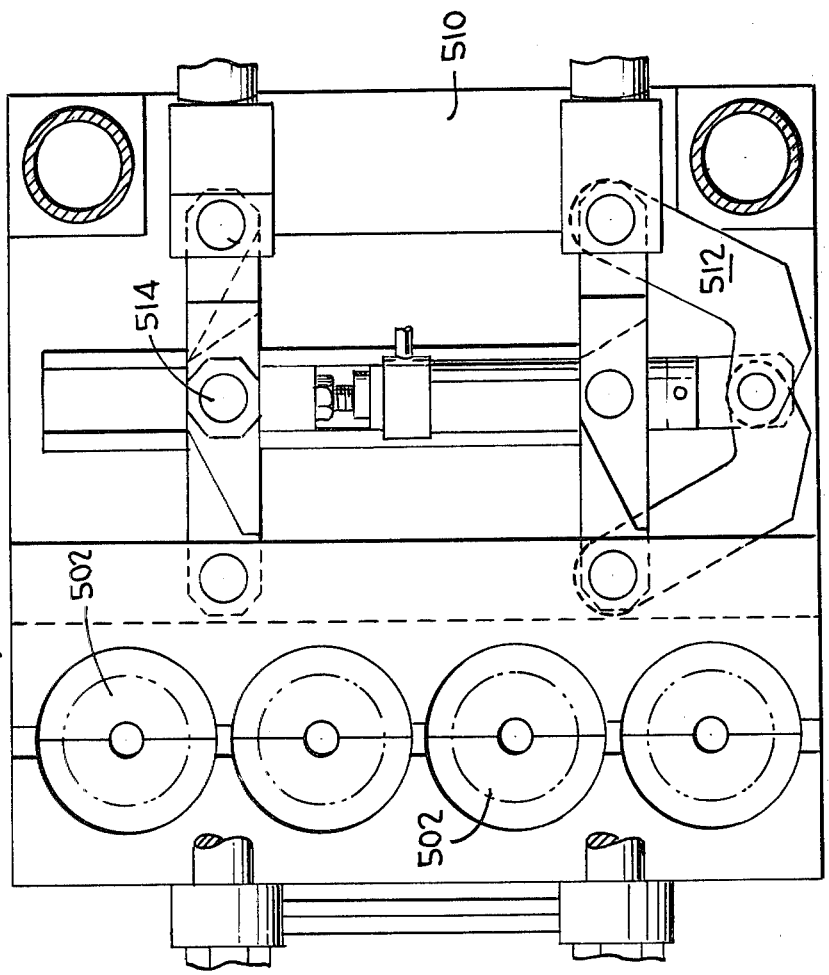
FIG. 22a is a plan view of the blow mold assembly.

Simultaneous with the closing of the mold and the commencement of formation of a new set of parisons, the rotary transfer mechanism 240 as best shown in FIG. 7 is moved inward transversely by air cylinder 246 on rods 242 and 244. Upon moving forward, the gripper jaws 208 on the take-out mechanism holding the parisons permits the parisons to be centered against the stop bar 238 as a result of the neck flange 9 of parison 8 being brought into contact with the stop bar 238 by collets 249. This is desirable in order that all of the parisons are exactly even for subsequent gripping by the collets and jaws of the storage plate, lateral transfer unit and the shuttle jaws as shown in FIG. 26 where SR-1 is the first position of stop rail 238; SR-2 is the second position of the stop rail, i.e., butted against parison flange 9; SPJ is the storage plate jaws; LTJ is the lateral transfer jaw; SMJ is the shuttle mechanism jaw, and BM is the top part of the blow mold. With the parison butting up against the stop bar 238, actuator plate 270 simultaneously contacts all sixteen collet actuators 262 and the collet probe 250 enters the necks of the parisons. Substantially simultaneously, the take-out gripper jaws 208 are released as shown in FIG. 7 and the collets grip the preforms, permitting the preform to be withdrawn by the transverse movement of the collets when piston rod 245 of air cylinder 246 is retracted. The transverse plate 248 is then rotated downward ninety degrees as best shown in FIG. 8, to place the preforms in position in the storage plate 300. At the time the transverse plate 248 carrying the collets 249 is rotated downward, the jaws 303 of the storage plate are open. After the parisons are rotated into the vertical position, the jaws of the storage plate close securing the preforms while the collets are released and retracted. The transverse plate is rotated ninety degrees upward into a position for receiving the next group of parisons.

The storage plate 300 after receiving the parisons permits temperature-conditioning of the parisons with heat-conditioning element 350. As shown in FIGS. 13 and 14, the storage element riding on vertical rods 352 can rise upward clearing the bottom 403 of the lateral transfer unit 402 and encompassing the preforms 8 while in the storage plate. As is apparent from the broken-away view in FIG. 14, the heat-conditioning unit is constructed in order that the pockets 351 avoid carrier rod 370.

When the preforms are properly heat-conditioned within the heating pockets, the heating element is lowered clearing the way for the transverse movement of the lateral transfer unit 402. The lateral transfer mechanism as best shown in FIGS. 15 and 16 enters under the storage plate being guided between the rows of parisons with the lateral transfer jaws being open. After the lateral transfer unit is properly positioned, the jaws of the lateral transfer unit are closed and the jaws of the storage plate are opened. The parisons are withdrawn transversely from under the storage plate by large air cylinder 416. The first row of parisons are then positioned for acceptance by the shuttle mechanism 450. The shuttle jaws 454 come in, grasp the first row of preforms, position A of FIG. 25; and thereafter retract to position B, depositing the first row of preforms into the open blow molds 502. Simultaneously, the blow molds close about the preforms while the shuttle jaws are still in place and the lateral transfer unit indexes the second row of parisons into the shuttle position as shown in FIG. 17. The shuttle jaws open and extend to the position C in FIG. 25 to secure a second set of parisons. Simultaneous with this movement, the blowhead of the blow mold assembly comes down and the first set of parisons are blown to the finished bottles. The jaws of the shuttle close around the second row of preforms and around the finished bottles 608 in the blow molds. The blowhead rises, the blow mold opens, and the shuttle mechanism retracts into position D of FIG. 25 carrying the finished bottles to conveyor mechanism 600 while positioning the second row of preforms in the blow molds. Simultaneously the blow mold closes, the third row of parisons are indexed into the shuttle position as shown in FIG. 17, and the shuttle returns to position A for the third row of preforms. The cycle is continuously repeated.

Although the improved machine system has been described using a 20-second cycle designed for the use of PET, the machine system can be modified to accommodate the curing characteristics of any plastic material. Moreover, although the improved machine system has been described using sixteen preform molds and four blow molds, the ratio can be modified to best suit a given temperature cycle. The ratios can be any whole number such as 8 to 2; 4 to 1; 9 to 3; 3 to 1, or the like.

Additionally, the machine system and process, since the neck ring is removed from the parison after formation at the parison-forming station of the neck ring finish, permits the complete temperature-conditioning of the neck and shoulder areas of the parison. Thus, in a system in which the neck ring mechanism is used as a means of transferring the parison from the parison-forming station to the blow station, it is not possible in view of the heat-transfer characteristics of the neck ring to effectively temperature-condition the neck and shoulder areas of the parison. This can lead to defects in the neck and shoulder areas of the final bottles. According to the present machine system and process, it is possible to apply heat or remove heat during the parison transfer or storage period to and from those and only those areas of the parison requiring temperature-conditioning. This temperature-conditioning permits a better transition from the neck finish to the body of the final bottles providing, inter alia, a better appearance.

Although the ability to heat-condition the parison including in select areas is a unique advantage of the presently described machine system and process, it is to be understood that it may not be essential, depending upon the total operating conditions, to use a heat-conditioning element. If the heat-conditioning element is not employed, various modifications can be made in both the rotary transfer mechanism and in the lateral transfer mechanism.

As will be apparent to one skilled in the art, various modifications can be made in the hereinbefore described machine system and process with respect to making improved bottles. The preferred embodiments described are not to be construed as a limitation of the invention.

It is claimed:

1. A device for simultaneously receiving and transferring a plurality of hot parisons comprising in combination support means; carriage means movably mounted on said support means; means for reciprocally moving said carriage means laterally to said support means; arm means mounted on said carriage means for lateral movement with said carriage means; a plurality of parison gripper means mounted on said arm means, each of said plurality of gripper means having a jaw set; actuating means for said jaw sets including a pair of actuating members, one jaw of each of said jaw sets mounted on one of a pair of said actuating members and the other jaw of said jaw sets mounted on the other of said pair of actuating members constructed and arranged with said arm means and actuating means, said actuating means for actuation of said actuating members being constructed and arranged with said actuating members to simultaneously open or close said jaw sets upon actuation of said actuating members.

2. The device of claim 1 further including a transfer plate carrying thereon a plurality of collets each to receive a parison from each of said gripper means; said transfer plate including means for the simultaneous actuation of said collets and means for lateral movement of said plate.

3. The device of claim 2 wherein said collets each comprise an outer sleeve and an inner sleeve spaced therefrom each terminating in a free end; said inner sleeve encompassing an actuating member to be contacted with said means of said transfer plate terminating in a camming surface which in turn acts on the interior of said outer sleeve at its free end, and said outer sleeve being circumscribed substantially at its free end by an elastic member.

4. The device of claim 3 wherein said transfer plate includes means for rotating said plate ninety degrees and means for releasing said parisons into a storage plate.

5. The device of claim 1 wherein said actuating means for said jaw sets include an air cylinder constructed and arranged with rack and pinion means.

6. The device of claim 1 wherein each of said jaw sets comprise a pair of pivotally mounted scissor arms, each of said scissor arms terminating in a U-shaped member, said U-shaped member of each scissor arm carring gripper fingers attached to said U-shaped member by resilient mounting means.

7. The device of claim 6 wherein said resilient mounting means comprise springs.

* * * * *